Aug. 8, 1967    R. C. JACKSON ETAL    3,334,850
CONCRETE MACHINERY BASE AND METHOD OF MAKING SAME
Filed Sept. 24, 1965    5 Sheets-Sheet 4

INVENTORS
RAYMOND C. JACKSON
JIM T. HARPER
ALAN T. WILLIAMS
JOHN L. JOPLIN
BY Arnold & Roylance ATTORNEYS

United States Patent Office 3,334,850
Patented Aug. 8, 1967

3,334,850
CONCRETE MACHINERY BASE AND METHOD
OF MAKING SAME
Raymond C. Jackson, Jim T. Harper, and Alan T. Williams, Houston, and John L. Joplin, Sugar Land, Tex., assignors to Oil and Gas Supply Company, Houston, Tex., a corporation of Texas
Filed Sept. 24, 1965, Ser. No. 490,004
31 Claims. (Cl. 248—19)

ABSTRACT OF THE DISCLOSURE

The present invention pertains to portable concrete machinery bases and their method of manufacture and installation, the bases being particularly well-suited for mounting heavy machinery having precision aligned operating parts. The unitary base structure comprises generally a peripheral framework having both transverse and longitudinal members prestressed together and providing mounting members for securing the machinery as by threaded fasteners or welding, voids being provided by wholly enclosed boxes, the members to which machinery parts are welded being heat-insulated from the concrete in which they are embedded. The mounting members further have anchoring means to improvedly fix the framework within the structure. The underneath side of the base has a plurality of depressions and communicating means therewith so as to permit leveling by flowing foundation material. The base further includes embedded elongate cylindrical bars as a handling means and embedded skid rails at the underneath bevelled ends thereof. The fabrication of the base incorporates as a functional part therewith the precision alignment of the machinery mounted thereon, such that upon removal to a remote location, no realignment of the machinery is required because of the base structure.

---

This invention relates generally to bases for heavy equipment, and more particularly to an improved integrally cast, portable, reinforced concrete base for heavy machinery.

More particularly, the invention relates to a substantially rigid lightweight reinforced concrete base and a method for making same, for heavy oil field equipment, the base being particularly characterized by its strength and substantial rigidity which permits factory mounting and aligning the machinery on the base prior to moving same to its place of use without the need for re-aligning the machinery on the base after it is moved.

One practice in the prior art is to mount heavy oil field equipment on cast-in-situ concrete foundations which are quite expensive and require a considerable time to prepare because of the required excavation, building of forms, and pouring and setting of the concrete for the foundation. Then, when the oil well equipment has served its purpose and is moved to another location it is required that the concrete foundation be removed to restore the property to its original condition, which necessitates additional expense.

To alleviate this problem it has been proposed in the past to provide concrete bases made up of sections which are transported to the site of use and assembled to provide a base for heavy equipment. After the base is assembled and set on a foundation the machinery is secured to the base and is aligned.

Another prior proposed solution to the problem of cast-in-situ foundations is to provide a solid concrete base which is transported to the place of use of the machinery in completed form and thereafter the heavy machinery is secured to the base and aligned. However, this solution to the old-standing problem is also not wholly satisfactory because of the considerable amount of time required to align heavy machinery in the field, where elaborate alignment equipment is usually not available.

It has also been a common practice in the past to mount relatively heavy oil field equipment on fabricated metal bases and then transport the base and equipment as a unit to the place of use in the oil field. However, because of the nature of the heavy equipment a concrete foundation is still required to dampen vibration of such oil well machinery and equipment as pump jacks and compressors. In addition, the metal base arrangement has proven unsatisfactory because it is virtually impossible to construct a metal base which is sufficiently rigid to avoid the need for re-aligning the equipment after the metal base with equipment thereon is transported to the field while still maintaining the weight of the base within practical limits for transportation to the place of use.

The shortcomings of these prior approaches to the problem of providing bases and foundations for heavy machinery such as oil field equipment are readily apparent. The concrete base structures which are transported to the field in sections require considerable time for assembling, and mounting and aligning of the equipment on the thus assembled base. In addition, it is necessary to remove the equipment from the base, disassemble the base, and transport the base and equipment separately to the new place of use of the equipment whereupon it is necessary to reassemble the base and remount and re-align the equipment. Transporting merely a finished concrete base to its place of use and then mounting and aligning the necessary equipment on the base has also proven unsatisfactory because of the difficulty and expense of precisely aligning such equipment in the field. Indeed, the advantage of factory mounted and aligned equipment is lost. In addition, with the known prior art bases it is necessary to remove the equipment from the base and transport the equipment and the base separately to its new place of use. The shortcomings of a metal base are readily apparent in view of the above explanation, and in addition it is to be appreciated that the concrete foundation on which the metal base mounted equipment rests must always be removed to restore the site to its original condition.

Applicants, with this invention, provide a concrete base and method of constructing same and of handling heavy oil field and similar equipment which avoids the shortcomings of the previously proposed and used bases for heavy equipment. In accordance with this invention an extremely rigid and durable reinforced concrete base of integrally cast construction is provided, the base having embedded therein metal machinery mounting members at the time that the concrete is cast. These embedded members are so arranged that the desired machinery and equipment can be easily mounted on the base and securely fastened thereto at the factory prior to moving the base to its place of use in the field. The base itself is reinforced, not only by pretensioned reinforcing elements, but also by the machinery mounting framework embedded in the base. In addition, lightweight concrete aggregates are used and the base is provided with voids, wholly enclosed by the concrete of the base at the regions of least stress within the base.

The voids, reinforcing elements, and framework are so arranged that the finished base includes a plurality of longtiudinally extending reinforced concrete beams, a plurality of transversely extending reinforced concrete beams, and upper and lower concrete slabs, the beams and slabs being cast integral with each other in a single molding operation.

This construction provides for a base with extreme lightweight and yet wtih extreme rigidity and strength whereby the deflection of the base even when lifted by its ends is insufficient to create mis-alignment of the machinery factory mounted thereon prior to being transported to its place of use in the field.

In addition, the preformed base of this invention is provided with a unique arrangement of machinery mounting hold-down members to fix the desired major machinery to the base.

A plurality of supplementary equipment mounting members are also provided which are embedded in the base at the time that the base is cast. These supplementary mounting members take the form of elongated metal structural elements of weldable material to permit welding the supplementary equipment in place on the base. A unique characteristic of the suplementary equipment mounting members is the manner in which these members are secured to the concrete base in insulated relation to the base to prevent overheating and corresponding cracking of the concrete of the base during the welding operations. Such an arrangement permits the use of acetylene and other gas type welding equipment, to fix the supplementary equipment to the base, both before and after the concrete base with major equipment mounted thereon is transported to its place of use without danger of damaging the base. Since electric welding equipment, which is less apt to overheat the concrete is frequently not available in the field, the insulated supplementary support members substantially facilitate the attachment of the auxiliary equipment such as lubrication systems and the like.

To facilitate handling and transporation, certain regions of each concrete base, in accordance with this invention, are locally reinforced and provided with suitable hoist-connecting structure to permit lifting and handling the base with machinery mounted thereon with conventional hoisting and lifting equipment connected adjacent to the ends of the base only.

In accordance with another advantageous feature of the concrete base of this invention, an elaborately prepared foundation to support the base at the place of use of the machinery is unnecessary. The only requirement is that the foundation include sand or gravel for good drainage and that it be substantially level to adequately support the underside of the base. However, in the event that the foundation is not properly prepared by inadvertence on the part of the customer or service company placing the concrete base at its site or in the event of heaving or shifting of the foundation, the concrete base can be leveled and properly supported after the base is placed in position without the need for lifting or otherwise moving the base. This feature is provided by constructing the base with passages in the form of piping to permit pumping mud, sand, or other supporting material into shallow recesses formed in the underside of the concrete base. Although such "after leveling" of the base is not inexpensive, it is substantially less expensive than the costs involved in transporting to the site the heavy equipment originally used to place the concrete base with machinery mounted thereon in position at the site.

The basic scheme is to custom construct the concrete base and the machinery mounting framework including the major mounting and supplementary equipment mounting members to fit the needs of the machinery to be mounted on the base. However, there are similarities of construction which are common to all bases constructed in accordance with the method and structure of this invention. By virtue of these common construction features and the mode of making the base, bases can be constructed for any desired equipment and machinery at minimum cost using only several different types of molds and machinery hold-down members. Also, by using a predetermined pattern of voids and a prefabricated framework embedded in the material of the base, the base can be simply and economically formed.

The advantages discussed above as well as other features and advantages will become apparent with reference to the drawings which form a part of the specification and in which.

Figure 1:
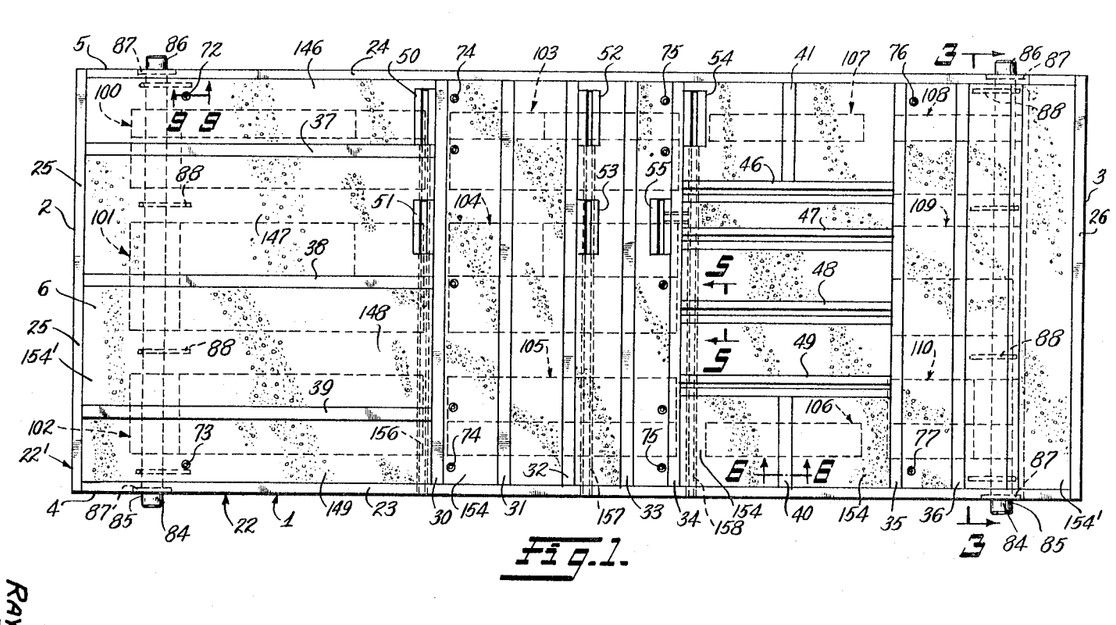
FIG. 1 is a top view of a first preferred embodiment of the concrete base of this invention.
Figure 2:
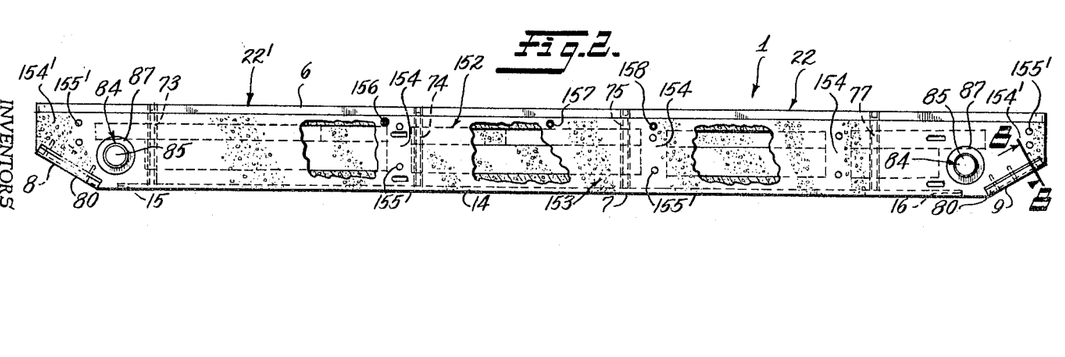
FIG. 2 is a plan view of the base of FIG. 1 with portions thereof cut away for purposes of illustration.

Referring now to the drawings in detail and particularly FIGS. 1 and 2 there is shown a first embodiment of a concrete base assembly 1 in accordance with this invention. Concrete base assembly 1 is generally rectangular in outline configuration, and in the embodiments of FIGS. 1 and 2 is approximately twice as long as measured between ends 2 and 3 as it is wide as measured between sides 4 and 5. Top surface 6 of base assembly 1 is flat and perpendicular with ends 2, 3 and sides 4, 5.

The lower portions of ends 2 and 3 each extend inwardly toward bottom 7 of the base to provide angled skid faces 8 and 9. The angled skid faces facilitate sliding the base with the machinery thereon during handling and positioning of the base.

Figure 3:
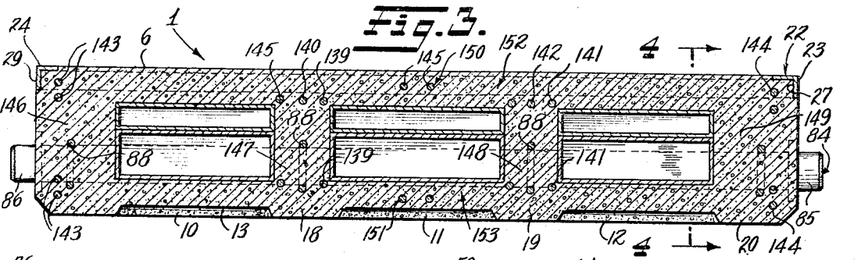
FIG. 3 is an enlarged view in section taken along lines 3—3 of FIG. 1.

With reference to FIGS. 2 and 3 it is seen that the bottom 7 of the base is provided with three identical shallow recesses 10–12 each having a downwardly facing surface 13 spaced slightly above and parallel with surface 14 of bottom 7. Each of recesses 10–12 extends longitudinally of base assembly 1 and terminates at end edges 15 and 16 (FIG. 2) each of which is spaced slightly from the junction of skid faces 8 and 9 with bottom 7. Recesses 10–12 are transversely spaced from each other and from sides 4 and 5 of the base assembly by ribs 17–20 (FIG. 3) provided by the material of the base assembly. Each of ribs 17–20 is approximately half the width of each of recesses 10–12 and the bottom of each rib is coplanar with bottom surface 14 of the base. Since recesses 10–12 are each closed at their sides and ends, it is apparent that each recess provides a downwardly opening depression. Recesses 10–12 are provided for a purpose which will subsequently be described.

A fabricated framework 22 is embedded in the concrete structure of base 1.

Figure 4:
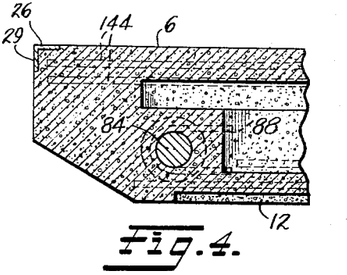
FIG. 4 is a fragmentary sectional view taken along lines 4—4 of FIG. 3.

Extending around the periphery of the top of base assembly 1 is a rectangular metal frame 22′ which is part of framework 22. Frame 22′ is formed from a pair of longitudinally extending legs 23 and 24 and a pair of transverse legs 25 and 26, legs 23-26 being formed from angle iron and having their ends welded together. It will be noted with reference to FIGS. 3 and 4 that the outer faces 29 of each of legs 23-26 are co-planar respectively, with the surfaces of sides 4 and 5 and the surfaces of ends 2 and 3.

Figure 6:
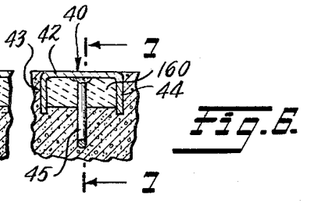
FIG. 6 is an enlarged fragmentary view in section taken along lines 6—6 of FIG. 1 and showing one preferred mode of insulating a supplementary equipment hold-down member from the concrete material of the base.
Figure 7:
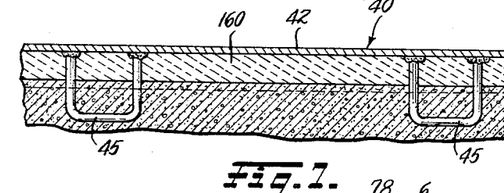
FIG. 7 is a fragmentary view in section taken along lines 7—7 of FIG. 6.

Framework 22 also includes a plurality of transverse structural steel channels 30-36 in spaced apart relation to each other extending between side legs 23 and 24 and welded thereto. The spacing between these transverse channels varies with the location of machinery on base assembly 1. Channels 30-34 are grouped so that this group of channels is offset only slightly from the center of the base in a direction toward end 2 of the base. Channels 35 and 36, however, are spaced longitudinally from channels 30-34 and are offset toward end 3 of the base. Extending across the large area between channel 30 and end leg 25 are spaced apart longitudinal channels 37-39. The opposite ends of channels 37-39 are welded respectively to end leg 25 and channel 30. Projecting inwardly of side legs 23 and 24 at a location spaced mid-way between channels 34 and 35 are short transverse channels 40 and 41. Each of channels 30-41 is of inverted U-shaped configuration as viewed in section at FIG. 6. Each of channels 30-41 is thus seen to include a central web 42 and legs 43 and 44 projecting in the same direction from the opposite sides of the web. A plurality of U-shaped embedding elements 45 formed from metal reinforcing bar stock have their ends welded to the underside of web 42 as shown at FIGS. 6 and 7. Embedding elements 45 are arranged in appropriately spaced apart relation from each other and project downwardly from the web a distance approximately twice the length of legs 43 and 44 of a channel. The embedding elements are secured to each of the channels at one-foot intervals along the channels. As will subsequently be described in detail, channels 30-41 provide supplementary equipment mounting members for mounting equipment such as lubrication systems and piping on the base assembly by welding.

Also included in the framework 22, in the region between the facing ends of partial transverse channels 40 and 41, and bounded by channels 34 and 35 are a plurality of spaced apart major equipment mounting members 46-49 which extend in a direction parallel with the sides 4 and 5 of the base. Mounting members 46-49 have their ends welded respectively to channels 34 and 35. A plurality of shorter major equipment mounting members 50-55 are welded to selected ones of the transverse channels so that members 50-55 extend generally transversely of the base.

Figure 5:
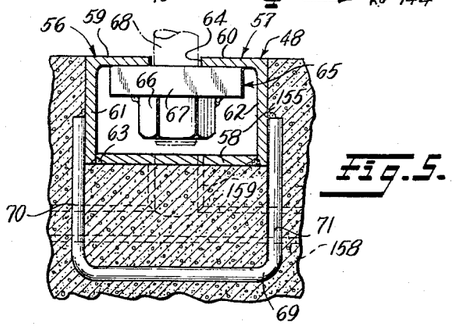
FIG. 5 is an enlarged fragmentary view in section taken along lines 5—5 of FIG. 1.

As shown at FIG. 5 each of major equipment mounting members 46-55 is fabricated from a pair of metal angle members 56 and 57 and a flat plate 58. The angles are arranged so that corresponding legs 59 and 60 are parallel and have their end edges spaced apart, and legs 61 and 62 are generally parallel and engage the side edges of plate 58. The ends of legs 61 and 62 are welded at 63 to the side edges of plate 58 to provide a generally C-shaped structure with an elongated opening as at 64 between the spaced ends of legs 59 and 60.

Located within each of major equipment mounting members 46-55 are several connector nut assemblies 65 comprised of an internally threaded nut 66 welded to a thick washer 67 having a diameter greater than the width of elongated opening 64 so the upper face of the washer engages the inner surfaces of legs 59 and 60 when an upward pull is exerted by a hold-down bolt 68 used to secure machinery to the base.

Embedding elements 69 of generally U-shaped configuration and formed from metal reinforcing bar stock are so formed that upstanding legs 70 and 71 engage the outer surfaces of legs 61 and 62 of the mounting members and are welded thereto. Embedding elements 69 are preferably located 6 inches from each other along each of the major mounting members. Since embedding elements 45 for channels 30-41 are located on 12-inch centers it is apparent that the embedding elements for the major equipment mounting members 46-55 are more closely spaced to more securely fasten the major mounting members to the concrete of base assembly 1.

Figures 9, 10:
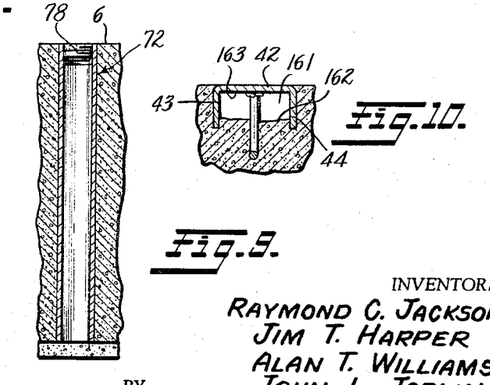
FIG. 9 is an enlarged fragmentary view in section taken along lines 9—9 of FIG. 1.
FIG. 10 is a view corresponding to FIG. 6 and showing a second mode of insulating a supplementary equipment hold-down member from the concrete material of the base.

Embedded in the concrete of the base assembly are a plurality of vertical pipes 72-77 each of which extends completely through the base in a vertical direction from top to bottom of the base. Each of pipes 72-77 is internally threaded to receive a plug 78 at its upper end, as shown at FIG. 9. Pipes 72 and 73 communicate respectively with recesses 10 and 12 at the bottom of base assembly 1. Similarly, pipes 76 and 77 communicate respectively with recesses 10 and 12. The series of pipes 74 extending parallel with channel 30 communicate with each of recesses 10-12 and similarly the series of pipes 75 arranged in a row parallel with channel 34 communicate with each of these recesses. Pipes 72-77 have a dual function. These pipes can be used to receive bolts for bolting equipment to the base, and also have utility for leveling the base, after it is placed on its foundation, by pumping mud or sand through the several pipes into the recesses 10-12 at the bottom of the base. The piping thus provides for communicating the region beneath the concrete structure of the base with the top of the base to facilitate "after-leveling" and improving the foundation on which the base is placed.

Figure 8:
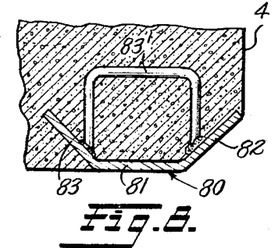
FIG. 8 is an enlarged fragmentary view in section taken along lines 8—8 of FIG. 2.

As shown at FIGS. 2 and 8, a skid rail 80 is embedded in base 1 at each side of each of skid faces 8 and 9. Each skid rail (FIG. 8) is of metal and has a center portion 81 and outwardly and upwardly extending legs 82 and 83 connected to the center portion. Inverted U-shaped embedding elements 84 are welded to the facing surfaces of legs 82 and 83 to secure the rails in place within the concrete of base assembly 1. It will be observed with reference to FIG. 8 that leg 83 of the skid rail is embedded in the concrete of the base assembly, and that the other leg 82 has its lower surface exposed and extends to the adjacent side of the base. In this manner each of the corners of the base are reinforced by a like arrangement of skid rails having the lower surface of portion 81 and leg 82 exposed.

Embedded in the concrete of the base adjacent each end and extending transversely thereof is a heavy elongated cylindrical bar 84 with ends 85 and 86 projecting slightly beyond the opposite sides of the base. Bars 84 are provided to strengthen and facilitate handling of the base after machinery and equipment is mounted thereon by attaching hoisting or towing cables to ends 85 and 86 of the bars. Adjacent the end of each bar is a heavy washer 87 which is welded to the bar and lies flush with the sides of the base. These washers prevent axial movement of bars 84.

To assure the absence of damage to the base when the base is lifted or pulled by suitable hoisting equipment attached to bar 84, each bar is provided with a plurality of spaced apart hairpin shaped reinforcing members 88 which extend around the bar and have their free ends projecting longitudinally toward the center of the base.

Figure 11:
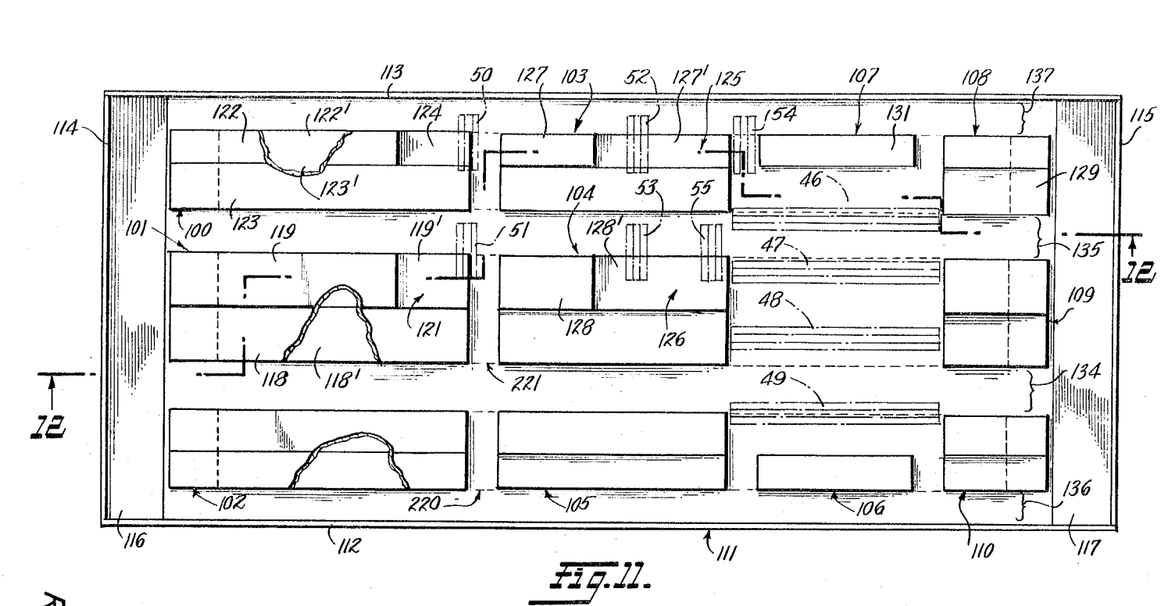
FIG. 11 is a top view showing the arrangement of void creating boxes disposed in a mold, for the concrete base of FIG. 1; with portions thereof cut away for clarity of illustration.
Figure 12:
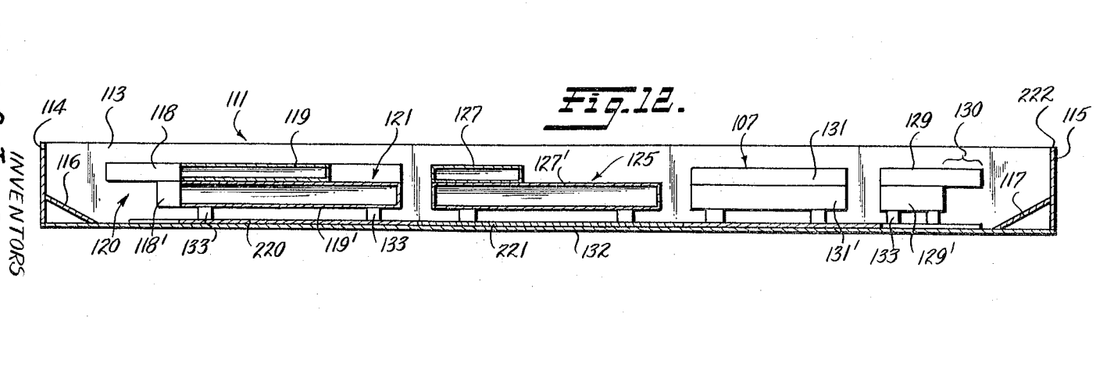
FIG. 12 is a view in section taken along lines 12—12 of FIG. 11.

A plurality of void creating forms are located within and completely enclosed by the concrete structure of base assembly 1 to reduce the weight of the finished base. With reference to FIGS. 11 and 12, which show the arrangement of the void creating forms in a mold prior to casting the concrete structure of the base, it will be observed that a plurality of void sets 100-110 are disposed within the confines of a mold 111 defined by side forms 112, 113, end forms 114, 115, and skid forms 116, 117 which provide the inclined skid faces 8 and 9 at each end of concrete base assembly 1. Each of void sets 100-110 is comprised of a plurality of completely enclosed thin walled, hollow rectangular parallelopiped boxes such as boxes 118 and 119. Boxes, such as 118 may be constructed from fibre board or Masonite which is waterproofed to avoid absorbing water from the concrete of the base during curing. Void set 101 includes four void creating boxes 118, 119, 118′ and 119′. Boxes 118 and 118′ are disposed in superposed relation one to the other and boxes 119 and 119′ are similarly disposed. The sides of boxes 118 and 118′ are in closely adjacent contacting relation with the sides of boxes 119 and 119′ and may be bound together in any well-known manner to form void set 101. Box 118′ is somewhat shorter than box 118 (FIG. 12) to provide space for additional concrete in the region generally indicated at 120 when the concrete is cast into the mold. It will be noted with reference to FIGS. 1 and 2 that this arrangement provides additional concrete material where bar 84 is embedded in the base. It will be observed with reference to FIG. 11 that box 119 similarly overhangs box 119′ at the left hand side of void set 101. To provide additional concrete material immediately beneath short transverse major mounting member 51 (shown in phantom lines in FIG. 11) a box 119 is selected which terminates short of the right hand end of box 110′ so that the concrete when poured fills the space 121 immediately above the right hand end of box 119′.

Void set 110 is similarly comprised of four void creating boxes 122 and 123 in superposed relation to boxes 122′ and 123′. The boxes of void set 100 are arranged to leave an unoccupied space beneath the overhanging ends of boxes 122 and 123, similar to space 120, as well as an unoccupied space 124, similar to space 121, thus providing additional concrete material to support major support member 50. In a similar manner, the boxes of void sets 103 and 104 are dimensioned and arranged to provide unoccupied spaces 125 and 126 in the mold to receive concrete material which provides additional support for major mounting members 52, 54, and 53, 55, respectively. This is accomplished by a similar arrangement of boxes wherein boxes 127 and 127′ of void set 103 are of different lengths, box 127 being substantially shorter to provide the space 125 in the area immediately above a portion of void creating box 127′. The arrangement at void set 104 is substantially similar in that box 128 is substantially shorter than box 128′ to leave the space 126 substantially unoccupied. Void sets 108–110 at the right hand side of FIG. 11 are arranged in a manner substantially the same as the void set at the left hand side of the mold in that the box in each upper tier overhangs each of the boxes of the lower tier to provide space for additional concrete for securely embedding bar 84. For example, with reference to FIG. 12 it can be seen that box 129 of the upper tier of each of sets 108–110 overhangs the box 129′ of the lower tier, as at 130.

With reference to FIGS. 1 and 11 it will be observed that no voids are provided in the rectangular zone of the concrete base within the confines of the ends of major mounting members 46–49 and the region bounded by these mounting members. Thus, additional concrete flows into these areas when cast to provide additional strength beneath major mounting members 46–49. For this reason void sets 106 and 107 are substantially narrower than void sets 103 and 105, void set 107 including only a box 131 superposed on box 131′. Void set 106 is identical to void set 107. As shown at FIG. 12 each void set is spaced from bottom 132 of the concrete receiving mold by supports, for example, in the form of concrete bricks 133 placed on the mold bottom to support the several void sets in spaced relation to the bottom.

With reference to FIG. 11 it will be observed that void sets 102, 105, 106 and 110 are each arranged in spaced relation to side form 112 of mold 111. Void sets 100, 103, 107, and 108 are similarly arranged with their sides spaced from side form 113 of the mold, the several sets of this series also being generally aligned longitudinally of the mold. The void sets 101, 104 and 109 are generally aligned longitudinally of the mold and are arranged to provide elongated spaces 134 and 135 at each side of the center row of void sets. Similar continuous elongated spaces 136 and 137 are provided between the sides of the sets of the outer rows and side forms 112 and 113 of the mold. These elongated spaces 134–137 are provided between the void sets and side forms of the mold to permit positioning a plurality of groups 139–144 of reinforcing rods 145 in these spaces prior to casting the concrete into the mold to thus provide reinforced integrally formed continuous longitudinally extending beams 146–149 in the finished base as shown at FIG. 3. In addition, sets 150 and 151 each with a pair of reinforcing rods 145 extend above and below the center row of void sets as shown in FIG. 3. Each reinforcing rod 145 of each set extends the entire length of the base and is tensioned prior to casting the concrete of the base.

After the concrete sets and is cured the tension is released from the rods 145 to prestress the concrete longitudinally of the base. The compressive stresses created by the reinforcing rods substantially strengthen the base since concrete is much stronger in compression than it is in tension. Although reinforcing rods 145 are not shown in FIGS. 11 and 12 it is to be understood that these reinforcing rods are positioned in the mold prior to casting the concrete material therein and that the rods can be pretensioned by any of the well-known methods of accomplishing this function.

Wtih reference to FIGS. 1–3, 11 and 12 will thus be apparent that the sets of voids are so arranged that continuous longitudinal beams 146–149 extend the entire length of the base between the three rows of voids sets and also at each side of the base. These beams 146–149 are formed integral with the continuous rectangular upper slab 152 of concrete above the sets of voids and are also integral with the slab-like structure 153 below the sets of voids at the bottom of the base. With reference to FIG. 3 it will be observed that the longitudinally extending beams 146–149 are aligned with ribs 17–20 at the bottom of the base.

With reference to FIGS. 1 and 2, it will be observed that the sets of voids within the base are aligned transversely thereof to provide continuous spaces between each row of voids as viewed transversely of the base. By virtue of this arrangement a plurality of continuous transversely extending beams 154 are provided in the concrete structure of base 1 as shown at FIG. 2. In addition, the concrete adjacent each of ends 2 and 3 of base 1 provides similar transversely extending beams 154′. The beams 154 and 154′ of this transverse arrangement are formed integral with beam 146–149 and upper and lower slabs 152 and 153 respectively. A plurality of transverse reinforcing bars 155′ are preferably provided the transverse spaces between void sets to reinforce transversely extending beams 154 and 154′. In the preferred embodiment of FIGS. 1 and 2, transverse beams 155′ are not tensioned, but can be, if desired.

Referring now to FIG. 5, it is seen that each major support member defines a space 155 which opens only upwardly at slot 64. The upper faces of legs 59 and 60 of angles 56 and 57 respectively are flush with the top surface of the concrete of the base, and each end of each of major support members 46–55 has its ends closed by the concrete of base 1. These spaces 155 are found to fill with water during inclement weather and also fill with oil and other solvents used with the machinery mounted on the base. Since cleaning the space 155 through the narrow slot at the top of each major support member is difficult, provision is made for draining water and other liquids from spaces 155. Such draining provision includes a plurality of sets of pipes 156–158 which communicate with spaces 155 in each of major support members 46–55 to drain liquids to side 4 of the base. Hence, as shown with regard to channel 48 in FIG. 5, drain piping 158 includes a T-connection 159 which communicates with space 155 of the channel. As shown in FIG. 1 the drain piping 158 then continues and connects with the spaces 155 in major support members 47, 46, 55, and 54. Piping 156 similarly connects with major support members 50 and 51 to drain the spaces 155 thereof. In a like manner piping 157 communicates with the spaces 155 of major support members 52 and 53. By virtue of this drain piping arrangement any liquid which enters the spaces in the major support members is drained to the side of the base by the piping 156–158 and hence, surface 6 of the base is maintained free of liquids.

Supplementary support members in the form of the channels 30–41 both reinforce the concrete material of base 1 and provide elements to which the supplementary equipment such as lubrication systems and piping for the major equipment mounted on the base may be welded to secure such supplementary devices to the base. To prevent damage to the concrete structure of the base during welding of the supplementary equipment to the channels, each channel is insulated relative to the concrete material of the base. As shown in FIGS. 6 and 7 a channel, such as channel 40, may be insulated from the concrete of the base by packing the space bounded by web 42 and legs 43 and 44 of each channel with insulation 160 that extends the entire length of the channel. Insulation 160 is asbestos or other heat resistant insulating material which will not be damaged by the high temperatures normally encountered when supplementary equipment is welded to the central web 42 of a channel.

A second mode of insulating a channel from the concrete material of the base is illustrated at FIG. 10. As shown, the channel is embedded in the concrete material of the base in such a manner that an air space 161 is provided between the upper surface 162 of the concrete and the lower surface 163 of central web 42 of the channel. The insulating air space 161 results from positioning the channels in the concrete mold prior to casting the concrete into the mold. A relatively thick concrete mix is poured to prevent the concrete from entering the air space 161. In this regard it will be noted that surface 162 of the concrete immediately beneath web 42 only slightly enters the space between legs 43 and 44.

Figures 13, 15:
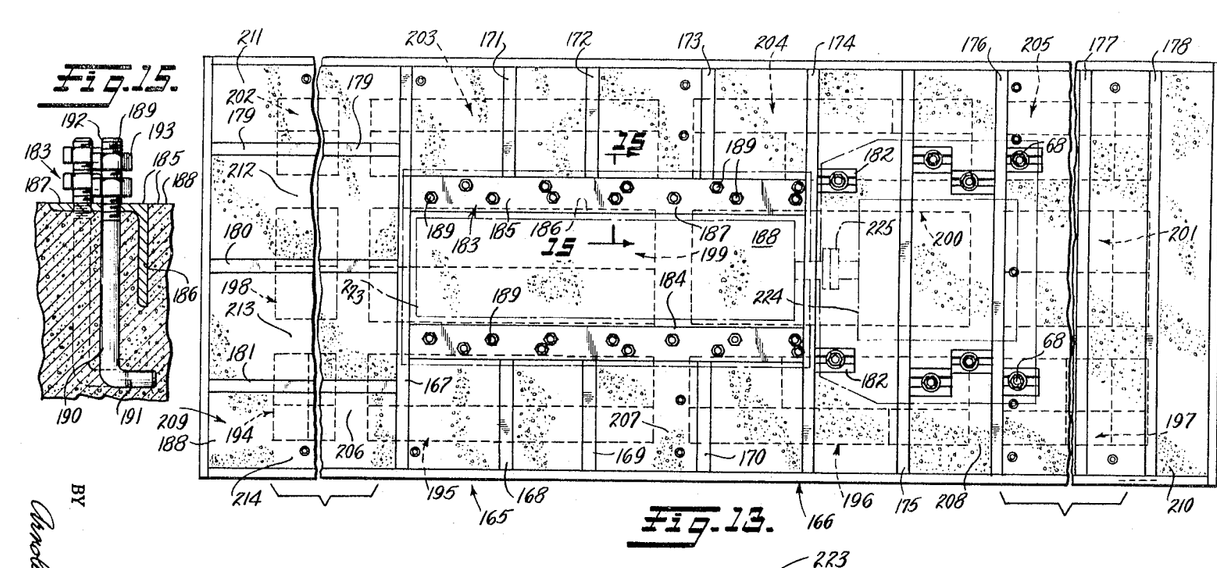
FIG. 13 is a top view of a concrete base in accordance with a second preferred embodiment of the invention.
FIG. 15 is a fragmentary view in section taken along lines 15—15 of FIG. 13.
Figure 14:
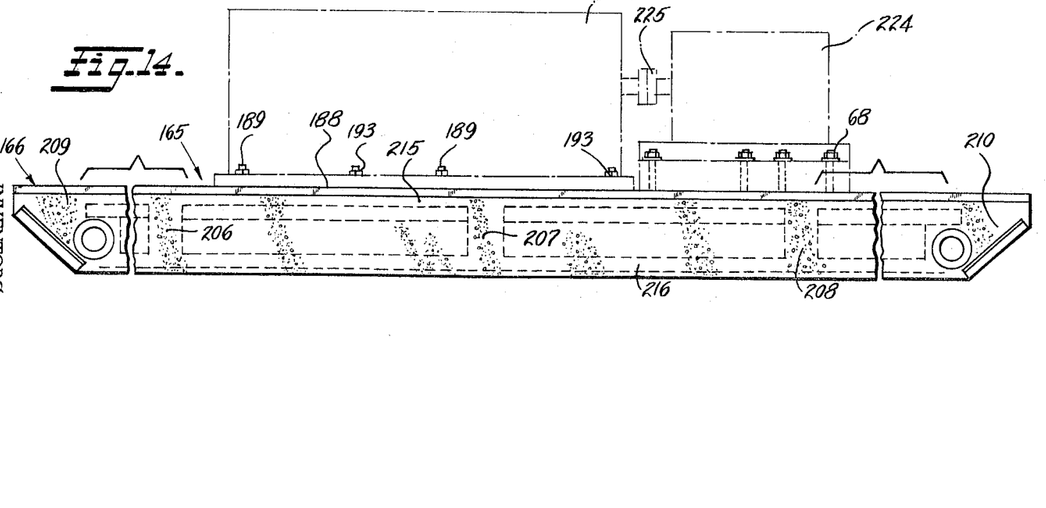
FIG. 14 is a plan view of the concrete base of FIG. 13.

Referring now to FIGS. 13 and 14 there is shown a second preferred embodiment of the concrete base of this invention. As shown, base assembly 165 includes a rectangular framework 166 which is essentially the same as framework 22 of the embodiments of FIGS. 1 and 2 save that framework 166 may be of different dimensions, depending on the dimensions of base 165. Framework 166 also includes a plurality of transversely extending supplementary support members in the form of channels 167–178. There are also longitudinally extending channels 179–181. A plurality of relatively short longitudinally extending major equipment mounting members 182 are also included in the structure of framework 166 major mounting members 182 being welded to selected ones of channels 174–176. The arrangement of framework including major equipment mounting members 182 of course depends upon the size and desired location of major equipment machinery to be mounted on base 165. In addition, framework 166 is provided with major equipment mounting assemblies 183 and 184 the construction of which is substantially different from the major equipment mounting members previously described. Major equipment mounting assemblies 183 and 184 are spaced from each other and extend longitudinally of base 165 in parallel relation.

The ends of each of major equipment mounting assemblies 183 and 184 are welded respectively to transverse channels 167 and 174. In addition the short transverse sections of channels 168–173 which extend from the side legs of the peripheral frame of framework 166 to the sides of channels 183 and 184 are welded at each end to the side legs and the major equipment mounting assemblies respectively.

As shown at FIG. 15 major equipment mounting assembly 183 includes a length of metal angle 185 with one leg thereof disposed vertically and embedded in the concrete structure of base 165 and the other leg 187 extending horizontally and having its top surface flush with top surface 188 of base 165. Openings are provided in leg 187 of the angle to accommodate a plurality of anchor bolts 189 in the pattern shown at FIG. 13, this pattern depending upon the mounting requirements of the equipment to be mounted on the base 165. Each anchor bolt 189 includes an elongated shank 190 with its lower end 191 bent at right angles thereto to strengthen the embedding of the anchor bolt within the concrete structure of base 165. Upper end 192 of shank 190 is externally threaded to receive internally threaded nuts 193 to secure the equipment to the base. As well be apparent with reference to FIG. 13, major equipment mounting assembly 184 is a mirror image of major equipment mounting assembly 183.

A plurality of void sets 194–205 (FIG. 13) are arranged in a substantially similar pattern to the void sets shown at FIGS. 11 and 12. Void sets 194–197 are arranged in a row in aligned relation longitudinally of base 165 and extend in spaced relation to one side of base 165. Similarly, void sets 202–205 are aligned longitudinally of the base in a row spaced from the other side of the base. The central row of void sets including void sets 198–201 are spaced between the outer rows of void sets and are also aligned longitudinally of base 165. In addition, the void sets are aligned transversely of the base. For example, void sets 194, 198, and 202 are each spaced the same distance from void sets 195, 199, and 203 respectively so that a transversely extending concrete beam 206 is formed in the space which extends transversely between these void sets (FIG. 14). Similarly, transversely extending beams 207 and 208 are formed between the other rows of transversely aligned sets of voids. The solid concrete portions 209 and 210 at the opposite ends of base 165 provide additional transverse beam-like sections for additional strength transversely of base 165.

It will also be apparent with reference to FIG. 13 that the longitudinally extending beams 211–214 in the spaces between the longitudinally aligned rows of void sets, and at the sides of base 165 are substantially identical to longitudinally extending beams 146–149 of base assembly 1 and transverse beams 206–210 of the concrete structure of base 165 are substantially identical to tranverse beams 154 and 154' of base 1. In addition, the slabs 215 and 216 at the top and bottom respectively of base 165 are integrally cast with all the transverse beams 206–210 and longitudinal beams 211–214 of base 165.

Although the other details of the base of FIGS. 13–15 will not be described in detail, it is to be understood that base 165 is of substantially the same construction as base assembly 1 including shallow recesses or depressions in the underside of the base, inclined skid faces at each end of the base, longitudinally extending reinforcing elements, transverse reinforcing rods, and transversely extending handling bars embedded in the concrete at each end of the base. The only essential difference is the difference in arrangement of the supplemental equipment mounting channels and the major equipment mounting members to accommodate a different type of equipment and machinery from that mounted on base assembly 1. It will be observed with reference to the drawings for base 1 and base 165 that a significant common characteristic of these bases is the concrete structure including vertical concrete beams which extend transversely and longitudinally of the base and which are integrally molded with each other and with the upper and lower slab portions of the base. This beam arrangement provided by the void sets arranged within the base provides a concrete base on which heavy machinery and equipment can be mounted and transported, without substantially sacrificing strength characteristics while providing a concrete base which is of extreme light weight relative to a solid concrete base. In fact, when the base of this invention is lifted, with the machinery mounted thereon, it exhibits better strength characteristics than a solid concrete base because the void decrease the weight of the base to such an extent that less deflection is encountered than with a solid concrete base.

Method of making concrete base assembly

Figure 16:
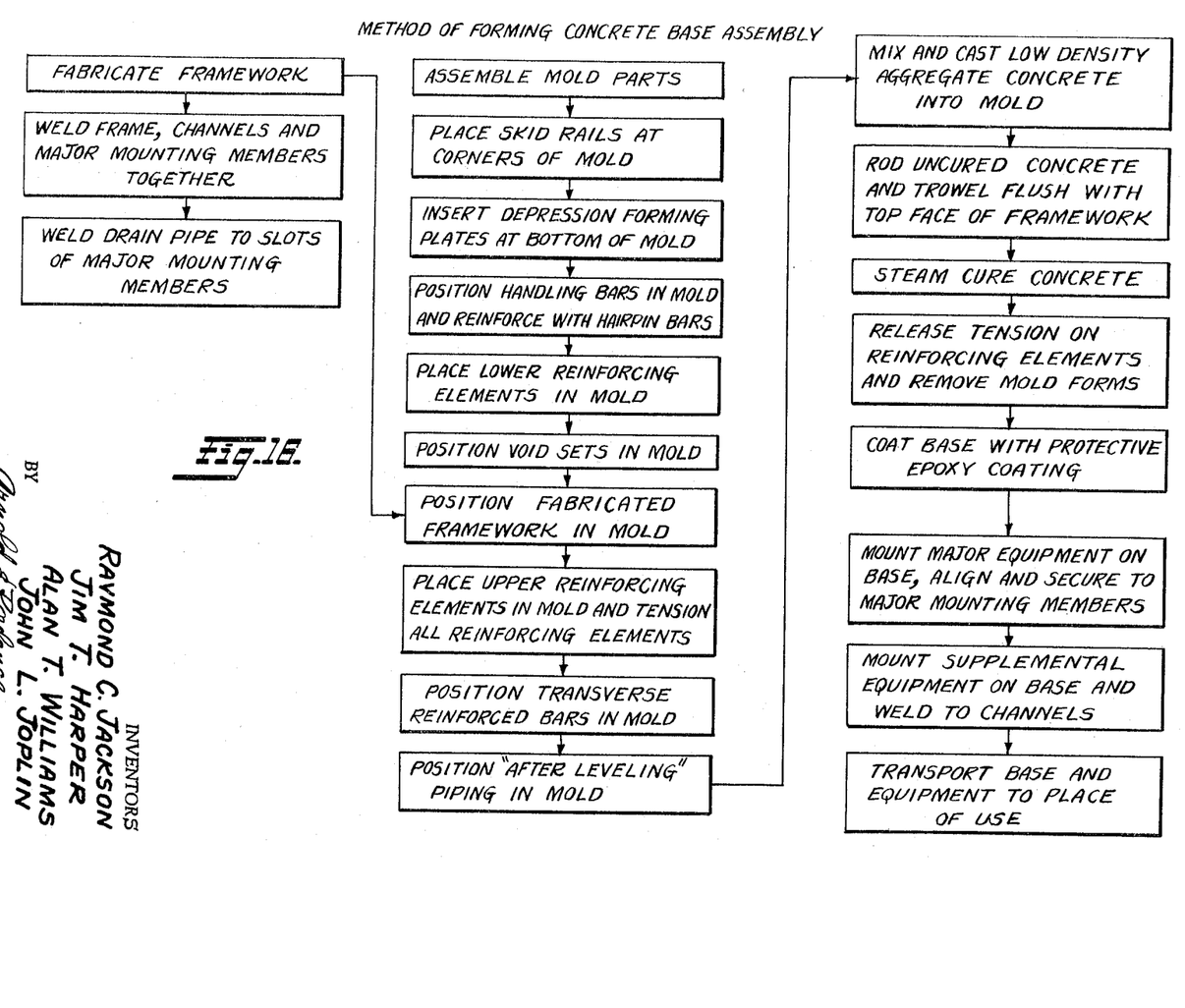
FIG. 16 is a block diagram showing the method of making the concrete base of this invention.

Concrete base assembly 1 and concrete base assembly 165 are each manufactured by the method shown at the block diagram of FIG. 16. The method of manufacturing the concrete base assembly is accomplished in the following manner for base 1.

First, mold 111 is formed. Although mold 111 is shown as comprised of side forms 112, 113, end forms 114, 115, and skid forms 16, 17, with the top of the mold substantially open and unobstructed, it is to be understood that any well-known mold-arrangement for molding concrete can be used.

After mold 111 is formed, rectangular substantially flat depression forming members in the form of elongated rectangular plates 220–221 are positioned on the bottom of the mold (FIGS. 11 and 12) to provide the shallow depressions 10–12 in the finished concrete base. Then, the sets of lower reinforcing elements 138–141 (FIG. 3) are positioned longitudinally of the mold and have their opposite ends which extend beyond the end forms of the mold secured to a well-known tension-creating device commonly used in prestressed concrete molding. Next, handling bars 88 are positioned within the mold in the positions shown at FIGS. 1 and 2 and four hairpin shaped reinforcing members 88 are positioned around each bar 84 in the position shown at FIGS. 3 and 4. Next, void sets 100–110 are positioned in mold 111 in the position shown at FIG. 11 to provide transversely and longitudinally extending spaces between the sets of voids. Each void set is spaced from the bottom of the mold by some spacing arrangement which may take the form for example, of concrete spacer blocks 133.

The fabricated framework 22 may be formed in two ways. In the first way of forming framework 22, frame 22' is fabricated by welding its sides 23 and 24 to end legs 25 and 26. Frame 22' is then supported in the mold with the upper surfaces of each leg flush with top edges 222 of the side and ends of mold 111. Transverse channels 30–34 are then positioned between sides 23 and 24 of the frame and are welded in position. Channels 35 and 36 are similarly secured to side legs 23 and 24 of frame 22'. Longitudinal channels 37–39 are then positioned between and welded to leg 25 and channel 30 respectively. Major support members 46–49 are fabricated in the manner previously described, and are then welded between channels 34 and 36. Short transverse channels 40 and 41 are then welded respectively between side legs 23 and major mounting member 49 and side leg 24 and major mounting member 46. The short transverse and major equipment mounting members 50–55 are then positioned in their appropriate locations adjacent transverse channels 30, 32, and 34, and are welded to these respective channels. Drain piping 156–158 is then provided to comunicate with the slots of each of the major equipment mounting members. Piping 156–158 is secured to flat plate 56 of each of the major equipment mounting members by welding.

The second way of forming framework 22 is to weld all the portions of the framework together before placing the fabricated frame in the mold. Such assembling is accomplished in the manner set forth above except that the framework is not placed in the mold until it is completely fabricated.

Pipes 72–77 are then positioned within the mold with their axes perpendicular with the depression forming plates 220–221. A plug 78 is threaded into the upper end of each of pipes 72–77 to exclude concrete during molding. These pipes may be supported in the mold in any well-known manner but are preferably supported by tack welding same to a short length of reinforcing rod which is tack welded to an adjacent channel or some other metal member within the mold.

Then, the upper sets 142–144 and 150 of reinforcing elements are positioned within the mold to extend longitudinally thereof and are secured to the tension applying mechanism. All the longitudinal reinforcing elements are then tensioned to substantially elongate these reinforcing elements within their elastic limits. Transverse reinforcing rods 155' are then placed in the mold (FIG. 2).

A high strength mixture of cement, sand, and low-density aggregate is formed. The aggregate may be expanded shale or clay haydite, or expanded vermiculite having a density of 50–80 lbs. per cubic ft. This concrete mix is cast into mold 111 to completely fill the mold. To assure the absence of undesired voids and cavities within the concrete mix, the concrete is tamped or vibrated in the well-known manner before its sets. Sufficient concrete is cast into the mold to bring the level of the concrete flush with the co-planar upper surfaces of the framework. The surfaces of the concrete exposed between the upper faces of the framework are troweled to provide smooth flat concrete surfaces at the top of the base which are flush with the upper surfaces of the framework. The cast concrete is then steam cured to decrease the length of time required to obtain high strength concrete. This steam curing, which is well known in the art, provides high strength concrete after several days curing. After the concrete is set and cured tension is released from the longitudinal reinforcing elements and these elements are cut off flush with the ends 2 and 3 and skid faces 8 and 9 of the base assembly. All exposed surfaces of the concrete structure of the base are then coated with an oil and solvent resistant epoxy coating which may be in the form of any well-known catalyst hardened type epoxy paint or coating for masonry and other materials. Although this method has been described for concrete base assembly 1, it is to be understood that the same method is used to form the base assembly 165 of FIGS. 13 and 14.

FIGS. 13 and 14 show heavy major equipment in the form of a prime mover 223 and driven device 224 with their shafts coupled directly together by coupling 225. Such direct coupling requires that the shaft of the driven device be precisely aligned with the shaft of the prime mover. Alignment is readily accomplished at the factory, where the base is formed, and where special alignment equipment is readily available. After the equipment is aligned the driven device is secured to the base by threading hold down bolts 68 into nut assemblies 65 (FIG. 5) located within major support members 182 (FIG. 13). Prime mover 223 is secured to the base with nuts 193 threaded onto bolts 190 anchored in the concrete of base 165 (FIGS. 13–15).

The major equipment may then be aligned at the factory where special aligning and heavy equipment hoisting devices are conveniently available. Supplemental equipment such as lubrication systems for the prime mover and driven device are then properly located and welded to the appropriate ones of the transverse or longitudinally extending channels embedded in the concrete structure of the base. The base assembly can then be readily handled by connecting wire cable to the projecting ends 85 and 86 of handling bar 84.

The preferred mode of handling the base includes skidding the base assembly with equipment mounted thereon onto a flat bed truck using a winch arrangement secured to the truck. The base assembly with equipment mounted thereon may also be lifted onto the truck if hoisting equipment of sufficient capacity is available. The base assembly with equipment mounted thereon is then transported to its place of use, for example, at a gas pipeline booster station where the prime mover is an internal combustion gas engine and the driven device is a compressor, or adjacent an oil well where the prime mover is an internal combustion engine and the driven device is a pump jack. In each of these instances, it is to be understood that the prime mover and driven device comprises the major equipment mounted on the base. The base of the embodiment of FIG. 1 has a length of 19 feet, a width of 8 feet and a thickness from top to bottom of about 18 inches. Without the voids provided by the void sets the weight of the concrete alone would be about thirteen tons. However, the free spaces within the mold defined by the voids eliminate about three tons of concrete without substantially affecting the strength of the mold. Hence, the weight of the concrete structure of the base assembly is reduced from thirteen tons to ten tons. The weight of the framework and equipment carried by the base is about seven tons. Hence, the decrease in weight of the concrete alone as a result of the voids is approximately one-half the weight of the framework and major and supplemental equipment carried by the base.

The only foundation required for the base of this invention is a foundation of sand or gravel. This foundation is made preferably by excavating and then laying a bed of such sand and gravel. The height of the finished foundation is preferably slightly below the level of the surrounding ground to facilitate unloading the base from the truck trailer by which it is transported to its place of use merely by backing the trailer into the slight excavation. This permits sliding the base from the trailer to seat on the sand and gravel bed. With the base in position, shallow depressions 10–12 in the bottom of the base perform a dual function. First, the ribs 17–20 defined by the recesses sink slightly into the foundation sand and gravel until the base is eventually supported by these ribs as well as by the surfaces 13 of depressions 10–12. Since the ribs 17–20 sink into the foundation displacement of the base laterally or longitudinally due to the vibrations of the machinery mounted thereon is virtually eliminated.

The second function provided by depressions 10–12 is to permit "after leveling" of the base after it is in position on its foundation. Such after leveling is easily accomplished by introducing sand or mud to depressions 10–12 via the vertical piping 72–77 of the base. This is conveniently accomplished with any pumping equipment merely by removing plug 78 and attaching the discharge line of the mud or sand to the upper end of selected ones of pipes 72–77.

Although several preferred embodiments have been shown and described it is to be understood that numerous changes and variations can be made in both the method and base assembly constructed by the method, without departing from the scope of this invention. For example, although the void sets have been shown and described as generally rectangular and completely enclosed by the concrete structure of the base and although this arrangement has been found to be particularly advantageous, it is to be appreciated that the void sets may take different forms such as cylindrical or oval and be differently arranged without departing from the scope of this invention.

What is claimed is:

1. A preformed base for heavy machinery and equipment comprising, in combination
   an integrally cast concrete structure;
   reinforcing means for reinforcing said concrete structure, said reinforcing means comprising
     a preformed fabricated metal framework, and
     a plurality of reinforcing elements,
     said metal framework and reinforcing elements being embedded in said cast concrete structure;
   said fabricated metal framework comprising
     a plurality of major equipment mounting members,
     a plurality of supplemental equipment mounting members, and
     means securing said members to each other;
   anchoring means fixed to said metal framework and embedded in said concrete structure to fix said framework to said structure; and
   heavy factory aligned major equipment fixed to said major equipment mounting members;
   said reinforced concrete structure being sufficiently rigid to prevent misalignment of said equipment during transporting of said base;
   whereby said base and factory aligned equipment mounted thereon may be readily transport to a place of use as a composite unit without danger of misaligning said equipment.

2. A preformed base in accordance with claim 1 in which
   said reinforcing elements are pretensioned to provide a prestressed concrete base.

3. A preformed base in accordance with claim 1 in which
   said preformed base includes
     a plurality of shallow depressions in the bottom surface of said concrete structure.

4. A preformed base in accordance with claim 1, and including
   void defining means,
     said void defining means having a plurality of substantially rigid wholly enclosed void creating boxes,
     said boxes being structurally rigid to support the concrete of said structure during curing.

5. A preformed base in accordance with claim 1 in which
   said anchoring means secured to said framework and embedded in said concrete structure are
     a plurality of U-shaped elements of reinforcing rod material,
     sadi U-shaped elements being secured to said supplemental equipment mounting structural elements and said major equipment mounting members.

6. A preformed base in accordance with claim 1 in which
   said major equipment mounting members have openings therein, and
   threaded fasteners are located within said openings.

7. A preformed base in accordance with claim 1 in which
   said major equipment mounting members include
     a pair of elongated metal angles embedded in the concrete structure of said base,
     said angles having openings therein to receive anchor bolts embedded in said concrete.

8. A preformed base in accordance with claim 1 in which said supplemental equipment mounting members are each inverted U-shaped channels having downwardly extending legs, and said legs are embedded in said concrete structure and including
   insulating means within said channels to thermally insulate said channels from said concrete structure;
   whereby, supplemental equipment may be welded to said channels without danger of damaging said concrete structure.

9. A preformed base in accordance with claim 1 in which
   said concrete structure is elongated and has a plurality of downwardly facing shallow depressions at the bottom thereof; and
   means extending through said base and communicating with said depressions to permit flowing foundation material into said depressions without lifting or otherwise moving said base.

10. A preformed base for heavy machinery and equipment comprising, in combination
    a preformed fabricated metal framework comprised of
      a plurality of major equipment mounting members,
      a plurality of supplemental equipment mounting members, and
      means securing said members to each other;
    an integrally cast concrete structure;
    anchoring means fixed to said metal framework and embedded in said structure to secure said framework to said concrete structure;
    void defining means defining a pattern of voids in said concrete structure, said void defining means being arranged to provide a plurality of integrally cast concrete beams extending longitudinally and transversely of said concrete structure;

major equipment secured to said major equipment mounting members; and means on said base to facilitate handling of said base during transporting to the place of use of said equipment;

whereby, major equipment mounted on said base may be factory aligned and said base and equipment mounted thereon may be readily moved and transported to a desired place of use as a composite unit.

11. A preformed base in accordance with claim 10 in which said plurality of major equipment mounting members are fabricated structural elements having means to receive fasteners to secure said equipment to said base.

12. A preformed base in accordance with claim 11 in which said means to receive fasteners to fasten said equipment to said base are
slots provided in said structural metal elements.

13. A preformed base in accordance with claim 10 in which said means defining a pattern of voids is comprised of
a plurality of hollow forms embedded within the material of said concrete structure and completely enclosed by the concrete of said structure.

14. A preformed base in accordance with claim 10 in which said supplemental equipment mounting members are structural metal elements embedded in said concrete structure.

15. A preformed base in accordance with claim 14 in which said structural metal elements for mounting said supplemental equipment have portions thereof insulated from said concrete structure to prevent damage to said concrete structure during mounting of the supplementary equipment by welding same to said structural metal elements.

16. A preformed base in accordance with claim 10 in which said major equipment mounting members and said void defining means are so arranged relative to each other that a substantial thickness of concrete structure is present immediately beneath each of said major equipment mounting members.

17. A preformed base in accordance with claim 10 in which said preformed fabricated metal framework further includes
a metal frame extending around the periphery of said concrete structure adjacent its upper surface and secured to said equipment mounting members.

18. A preformed base in accordance with claim 10, in which said means on said base to facilitate handling includes at least one embedded elongated cylindrical bar, the ends of which extend slightly beyond two opposite sides of the base.

19. A preformed base in accordance with claim 10, in which the underneath surface of at least one end includes an embedded skid rail.

20. A preformed base for heavy equipment and machinery comprising in combination a preformed fabricated metal framework comprised of
a generally rectangular metal frame having side members and end members,
a plurality of metal supplemental equipment structural elements secured to said frame,
a plurality of major equipment mounting members secured to said structural elements within the confines of said frame;

an integrally cast concrete structure;
said concrete structure having a generally rectangular outlined configuration substantially the same as said rectangular frame;

anchoring means secured to said framework and embedded in said concrete structure to fix said framework to said concrete structure in such a manner that said framework is embedded in said concrete structure with portions of said framework flush with and exposed relative to an exposed upper surface of said concrete structure;

void defining means within said concrete structure defining a regular pattern of voids therein, said void defining means be so arranged that said structure includes
a plurality of continuous transverse beam-like elements extending from one side of said concrete structure to the other,
a plurality of longitudinal beam-like structures extending from one end of said concrete structure to the other,
a continuous upper slab of concrete above said beams extending from one end of said concrete structure to the other, and
a continuous lower slab of concrete below said beams extending from one end of said concrete structure to the other;

said transverse beams, longitudinal beams, and upper and lower slabs being formed from integrally cast concrete; and heavy factory aligned major machinery secured to said major equipment mounting members;

said beams and slabs providing a concrete structure sufficiently rigid to prevent misalignment of said machinery during lifting and handling;

whereby, said base and machinery mounted thereon may be transported as an assembled unit without danger of misaligning said machinery.

21. A method of making a portable concrete base assembly for heavy equipment comprising, in combination providing a mold;
providing a fabricated equipment mounting framework including a plurality of equipment mounting members with generally co-planar surfaces in the mold;
positioning a plurality of reinforcing elements in said mold;
casting a concrete mix into said mold to embed said framework and reinforcing members in the concrete;
maintaining said surfaces of said machinery mounting members exposed;
curing said concrete mix to form a concrete base assembly;
mounting and aligning equipment on said base assembly; and
transporting said base assembly and equipment mounted thereon to its place of use.

22. A method in accordance with claim 21 which further includes positioning a plurality of shallow depression forming members in said mold.

23. A method in accordance with claim 21 which further includes positioning a plurality of void sets in said mold in spaced relation to the confines of the mold prior to casting said concrete mix.

24. A method in accordance with claim 21 which further includes securing a plurality of embedding elements to said framework prior to casting said concrete mix in said mold;
whereby, said fabricated framework is secured fixed to the concrete of said base assembly after curing.

25. A method in accordance with claim 21 which further includes
adding lightweight concrete aggregates to said concrete mix prior to casting said concrete mix into said mold.

26. A method in accordance with claim 21 which further includes
positioning skid rails at the corners of said mold prior to casting said concrete mix into the mold.

27. A method in accordance with claim 21 in which said equipment mounting framework is fabricated, and said fabricated framework is positioned in said mold as an assembled unit.

28. A method in accordance with claim 21 which further includes
providing a plurality of void defining completely closed hollow members of lightweight material within said mold, and
arranging said void creating members in a regular pattern to prevent said concrete mix from entering areas of said mold where the least stress is expected in the finished concrete base assembly.

29. A method of making a portable concrete base particularly characterized by its relatively light weight and rigidity to permit mounting heavy equipment thereon and aligning same prior to transporting said base comprising, in combination
providing a mold;
providing a fabricated equipment mounting framework in the mold, said framework having a plurality of machinery mounting members with co-planar surfaces;
positioning a plurality of longitudinal reinforcing elements in said mold and tensioning said reinforcing elements;
positioning a plurality of void creating closed hollow forms completely within the confines of said mold and spaced from the bounding surfaces thereof;
preparing a concrete mix with low density aggregates;
casting said concrete mix into said mold to embed said framework and reinforcing members in the concrete when it has cured;
maintaining said co-planar surfaces of said machinery mounting members exposed relative to the concrete of said mix;
curing said concrete mix to form a concrete base assembly;
releasing the tension on said reinforcing elements to prestress the concrete of said base assembly;
whereby, equipment may be mounted on said base and aligned prior to transporting said base to its intended place of use.

30. A method in accordance with claim 29 in which
said machinery mounting members of said framework are in the form of channels embedded in the concrete of said base; and
which further includes the step of
insulating said channels relative to said base during the forming of said base assembly;
whereby, supplemental equipment may be welded to the channels so insulated without danger of damaging the concrete of said base assembly due to the heat of welding.

31. A method in accordance with claim 29 which further includes
coating the exposed concrete surfaces of said base with a grease and solvent resistant coating after curing said concrete mix to protect the cured concrete of said base assembly.

References Cited

UNITED STATES PATENTS

| | | | |
|---|---|---|---|
| 1,581,262 | 4/1926 | Zabriskie | 52—710 X |
| 1,933,469 | 10/1933 | Aylward | 94—39 |
| 2,104,870 | 1/1938 | Levy | 52—495 X |
| 2,126,301 | 8/1938 | Wolcott | 52—577 |
| 2,158,081 | 5/1939 | Morrell | 52—495 |
| 2,192,182 | 3/1940 | Deutsch | 52—577 X |
| 2,321,813 | 6/1943 | Henzel | 52—612 X |
| 2,380,379 | 7/1945 | Attwood | 312—257 X |
| 2,590,685 | 3/1952 | Coff | 52—294 X |
| 2,802,632 | 8/1957 | Byers | 248—19 |
| 2,998,216 | 8/1961 | Hurd | 248—19 |

ROY D. FRAZIER, *Primary Examiner.*

F. DOMOTOR, *Assistant Examiner.*